(12) United States Patent
Felton

(10) Patent No.: X5169
(45) Date of Patent: Jul. 22, 1828

(54) THRASHING MACHINE

(76) Inventor: Samson Felton

Samson Fitton

Letters Patent

The schedule referred to in these Letters Patent and making part of
the same containing a description in the words of the said inventor
[illegible] of his improvement in the machine called the [illegible]
[illegible].

The machine is for thrashing or separating by rubbing the seeds kernel
of all kinds of grain from the straw stalk or cob such as wheat corn
[illegible] rye oats barley millet &c and also the seed of all kinds
of grass in the following manner: — there are four sills for the
machine to stand on the outside sills are the shortest, there are
eight posts framed into the middle of the sills opposite of the
sills [illegible] two rows of posts opposite of the machine. The roller and
apron or sheet operates or works between these two rows of posts
there is a frame or carriage locked [illegible] the middle of these posts and
[illegible] [illegible] or rods passes through this frame lengthwise, cat[illegible]
[illegible] the machine & passes through the feet of the springs that reg-
ulate the apron or sheet to the roller or cylinder & the springs are con-
[illegible] by bolts in the middle to the middle of the frame of the apron
and this makes four acting springs at each end The before mentioned rods are for the apron to
[illegible] or slide on the frame of the apron is covered with sheet iron
copper brass or tin & holes cut through large enough for the seed &
kernel to pass through after it is rubbed off the straw &c and there
are notches raised on the upper side of the [illegible] & between the holes to
take hold of the grain. as it passes between the roller & apron & these
notches being raised in the [illegible] resemble a grater. The roller is
made of the same material and resembles a grater on the outside [illegible]
[illegible] is a shaft passes thro' the roller lengthwise & near one end is a
pulley to give the roller its revolving motion. There are the journals on this shaft connected to a frame above the roller by a piece of
[illegible] [illegible] from each [illegible] to the frame & there are two [illegible]
that pass [illegible] this frame & are connected to another frame that is
calculated for that purpose; then rods are for the roller to vibrate or
[illegible] on. The roller revolves & vibrates at the same time, the apron
on [illegible] vibrates or [illegible] in opposition or when the roller slides
one way the apron slides the other way. This produces the rubbing
& first vital principle of the machine. I claim this principle as
[illegible] [illegible] discovery for the purposes herein described. And I claim this
in the making of rollers aprons shell &c. of iron or wood or any
kind of material of [illegible] on this principle. At one end of the ma
chine are posts girths &c. in a [illegible] frame [illegible] to the middle posts
& is to support the feeding cloth or table, there are two rollers of
wood that the cloth passes round & on one of the rollers & near the
end is a pulley to give the feeding pulley its motion.

At the other end of the machine are posts
girths &c. to support the main shaft fly wheel crank &c. — the fly
wheel is on one end of the shaft and near the wheel is the pulley to give
motion on the other end is the crank. One end of the pitman is at
[illegible] to the crank & the other end is connected to the first lever.

This lever is horizontal there is a shaft
[illegible] [illegible] this lever & at the other end of this shaft is the second
lever & is perpendicular & there is a connecting rod goes from this lever to
the third lever & is connected to [illegible] by pins & by raising this rod it give
a longer vibrating stroke or motion to both apron and roller in case
the grain is damp or hard of operation or shortens the vibrating
stroke by letting the rod down in case the grain is [illegible] dry and
good order for operation. This lengthening and shortening the vibra
ting [illegible] I claim as my own discovery for the purposes this ma
chine is intended & is the second vital principle.

The third lever has a shaft which passes
[illegible] at the [illegible] & the same shaft passes through the middle of the
fourth lever & acts as a fulcrum to the fourth lever. [illegible] the fourth lever

[illegible] power & motion at both ends & there is a connecting rod goes from the top end of the fourth lever to the roller & is fastened by a pin and there is a connecting rod attached to the bottom end of the fourth lever & to the apron or Shell B by the fourth lever acting in a [illegible] at the middle it causes the rubbing of both apron & Shell when in operation. The first wheel to give the whole motion to the machine is connected to an upright piece of [illegible] and [illegible] lightener, The band passes round this wheel and then round the pulley on the main shaft & then round the pulley that is on the shaft of the roller & then round the pulley that gives motion to the feeding cloth & then back under two other pulleys that are under the apron back to where it first began. When the machine being put in motion the grain is spread on the feeding cloth & is carried to the [illegible] the roller then revolving conveys the grain between the roller & the apron; then both roller & apron having then horizontal or vibrating the [illegible] & rubbing motion the grain is rubbed between the roller & apron & the seed or kernel is rubbed off or separated from the Straw Stalk &c. The seed then passes thro the holes in the apron and falls down on to the slide board or inclined plane & so passes off under that part of the machine the Straw then passes down the [illegible] & out of the machine in another place.

The particular properties or principles I claim as my own invention or discovery & I lay claim to the exclusive right in the same. First principle is the revolving of rollers & vibrating of rollers & aprons or Shells at the same time producing the rubbing principle before Stated to rub the seed or kernel off the Straw Stalk or cob. Second principle is the lengthening the vibrating Stroke or motion of the rollers & aprons or Shells &c in case the grain be damp or hard of operation or of shortening the vibrating stroke or motion in case the grain be dry and in good order for operation. Third principle is the general form position and construction of the whole machine to aid the two first principles mentioned.

All of the above specified apparatus I claim as my own invention or discovery for the purposes herein specified.

Witnesses
Geo. Hoffman of the City
Philad. Pack.

Samson Fellow (Seal)